March 4, 1958 — A. FRY — 2,825,130
CAST IRON PIPE CUTTER
Filed March 28, 1957

Alec Fry
INVENTOR.

United States Patent Office 2,825,130
Patented Mar. 4, 1958

2,825,130

CAST IRON PIPE CUTTER

Alec Fry, Shelbyville, Tenn.

Application March 28, 1957, Serial No. 649,233

2 Claims. (Cl. 30—92)

The present invention relates to a hand tool or implement which is expressly designed and constructed to enable one to expeditiously and reliably cut a length of cast iron pipe into sections or for whatever purpose the pipe has to be cut.

More specifically, in carrying out the invention in its preferred embodiment a substantially U-shaped head is provided and has a hammering and driving shank fixed to and projecting laterally beyond the outer perimeter of the bight portion where it is in a satisfactory position to enable one to strike the outer end with a hammer or mallet.

Experience has shown that an implement constructed as herein revealed makes it possible for the user to employ it to considerable advantage and with speed and accuracy under floors and generally inaccessible and hard-to-get-to places.

Novelty is also predicated on the construction disclosed and wherein the shank is sufficiently long and properly constructed that it has the additional function of a handle.

Then, too, novelty is predicated on providing the inner peripheral surfaces of the bight portions and limb portions with sharpened cutting blades each contributing its proportionate share to the progressive cutting and severance steps.

Other objects, features and advantages will become more readily apparent from the following description and the accompanying drawing.

In the drawing, wherein like numerals are employed to designate like parts throughout the views.

Figures 1, 2, 3:
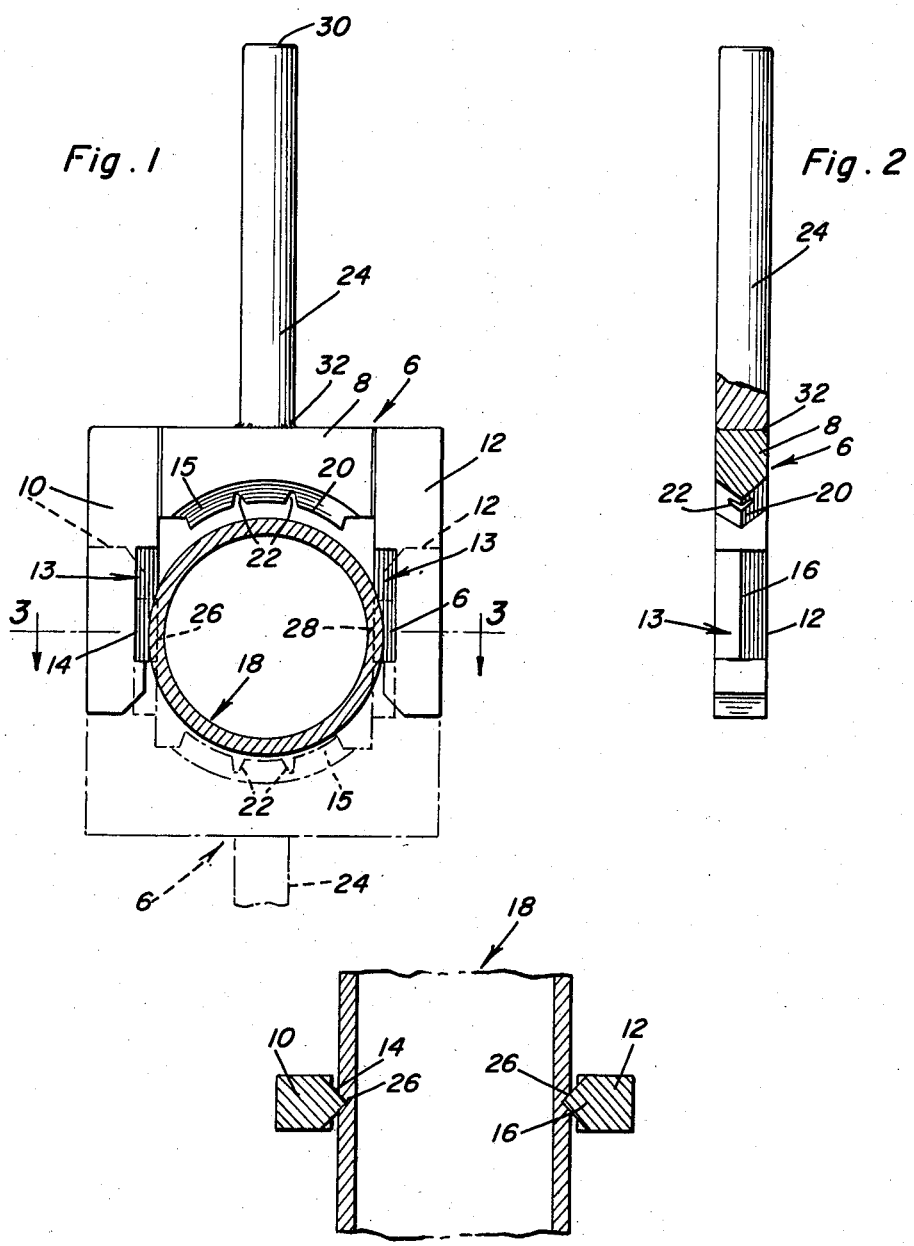
Fig. 1 is an elevational view of a cast iron or an equivalent pipe cutter constructed in accordance with the invention and showing how it is used on a section or length of pipe and also showing it applied from the top in full lines and reversed and applied from the bottom in phantom lines.
Fig. 2 is a view taken centrally through the implement with portions appearing in section and elevation.
Fig. 3 is a section on the horizontal line 3—3 of Fig. 1 looking in the direction of the arrows.

Referring now to the drawings the substantially U-shaped cutter head is denoted by the numeral 6 and it may be formed from a single metal casting or may be made up of several components. For convenience it may be thought of as embodying several component parts; namely, the block-like bight portion 8 and the spaced parallel laterally disposed arms 10 and 12 which arms are in requisite spaced apart relationship. The outer peripheral edge portions may be flat. In fact all of the components 8, 10 and 12 may be rectangular in cross section. The inward peripheral cutting surfaces are provided with individual cutter blades and the blades on the arms 10 and 12 are V-shaped in cross section and are substantially straight as denoted at 13. The three distinguishable cutting blades are denoted from left to right by the numerals 14, 15 and 16. The diametrically opposite ones 14 and 16 are V-shaped as already stated and linearly straight and therefore uniform in cross section from end to end. The intermediate blade is arcuate and conforms in curvature to the surface curvature of the pipe 18. The vertex or cutting edge 20 is provided with circumferentially spaced notches 22 which define several, more or less, cutting teeth. With this construction and assuming that the pipe is of the diameter shown compared to the distance between the cutting edges of the blades 14 and 16 it will be seen that by applying the tool in the manner depicted in Fig. 1 the driving of the shank 24 with a hammer or mallet serves to cause the blades 14 and 16 to "plough" through the metal surface defining the diametrically opposite cuts 26 and 28. Then a continued hammering against the shank serves to bring the cutting blade 15 into play which results in cuts occurring at equi-distant places. After the pipe is thus partially cut with the tool in the full line position seen in Fig. 1, the tool is then reversed and is applied from the bottom and further gashes or cuts are made and then by turning the tool bodily around the axis of the pipe and continuing the driving and cutting blows one gradually cuts through the pipe. As aforestated the shank 24 serves not only to accommodate the hammer or mallet by way of the impact end 30, it also serves as a handle. The inner end thereof is welded at 32 to a median portion of the outer peripheral surface of the over-all cutting head 6.

As is the situation with most tools and implements all users of the same do not follow the exact same steps in handling a particular job. Therefore, the emphasis is not so much on the mode of attachment and use but rather on the specific construction of the head 6 characterized by the several component parts 8, 10 and 12 with the circumferentially spaced cutting edges 14, 15 and 16 which cooperate in providing the user with a highly satisfactory cutting tool for cast iron pipes.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A pipe cutting tool comprising a rigid handle one end of which provides an impact surface to accommodate a mallet, hammer or equivalent implement, and a cutter head at the work applying end of said handle, said cutter head being substantially U-shaped in side elevation and the inner peripheral surfaces thereof being provided with individual circumferentially spaced cutting edges, there being at least three such cutting edges, two of them being diametrically opposite to each other, V-shaped in cross section and linearly straight from end to end.

2. A pipe cutting tool comprising a rigid handle one end of which provides an impact surface to accommodate a mallet, hammer or equivalent implement, and a cutter head at the work applying end of said handle, said cutter head being substantially U-shaped in side elevation and the inner peripheral surfaces thereof being provided with individual circumferentially spaced cutting edges, there being at least three such cutting edges, two of them being diametrically opposite to each other, V-shaped in cross section and linearly straight from end to end, and the third one being arcuate and also V-shaped in cross section and provided with individual notches defining cutting teeth.

References Cited in the file of this patent

UNITED STATES PATENTS 2,503,288    Moore               Apr. 11, 1950
2,589,742    Smith               Mar. 18, 1952